United States Patent [19]

Mege et al.

[11] Patent Number: 5,459,900
[45] Date of Patent: Oct. 24, 1995

[54] WIPING STRIP HAVING TWO CO-EXTRUDED MEMBERS AND A SCREEN WIPER HAVING SUCH A STRIP

[75] Inventors: Bernard Mege, Clermont; Jean-Luc Sortais, Beaumont, both of France

[73] Assignee: Valeo Systemes d'Essuyage, Montigny-le-Bretonneux, France

[21] Appl. No.: 243,206

[22] Filed: May 16, 1994

[30] Foreign Application Priority Data

May 17, 1993 [FR] France ................... 93 05927

[51] Int. Cl.⁶ ............................................ B60S 1/38
[52] U.S. Cl. .............................. 15/250.36; 15/245
[58] Field of Search ............... 15/250.36, 250.42, 15/250.40, 250.41, 245, 250.37, 250.38, 250.39, 250.33

[56] References Cited

U.S. PATENT DOCUMENTS

| | | | |
|---|---|---|---|
| 1,825,376 | 9/1931 | Vaughn | 15/250.36 |
| 2,797,428 | 7/1957 | Wallis | 15/250.36 |
| 3,099,031 | 7/1963 | Ludwig | 15/250.36 |
| 3,116,506 | 1/1964 | Browne et al. | 15/250.36 |
| 3,116,510 | 1/1964 | Oishei et al. | 15/250.42 |
| 3,882,567 | 5/1975 | Herzog | 15/250.36 |
| 4,622,712 | 11/1986 | Sugita et al. | 15/250.36 |
| 4,669,144 | 6/1987 | Yasukawa et al. | 15/250.36 |
| 4,698,874 | 10/1987 | Fritz, Jr. | 15/250.33 |
| 4,930,180 | 6/1990 | Congman | 15/250.36 |
| 5,208,939 | 5/1993 | Oulie | 15/250.36 |

FOREIGN PATENT DOCUMENTS

| | | | |
|---|---|---|---|
| 0437806 | 7/1991 | European Pat. Off. | |
| 1306952 | 9/1962 | France | |
| 2142477 | 1/1973 | France | |
| 2248962 | 5/1975 | France | |
| 2557525 | 7/1985 | France | 15/250.42 |
| 2353368 | 5/1975 | Germany | 15/250.42 |
| 3337815 | 3/1985 | Germany | |
| 3440677 | 5/1985 | Germany | |
| 138048 | 10/1981 | Japan | 15/250.36 |
| 2069326 | 8/1981 | United Kingdom | 15/250.36 |
| 9111349 | 8/1991 | WIPO | |

Primary Examiner—Gary K. Graham
Attorney, Agent, or Firm—Morgan & Finnegan

[57] ABSTRACT

A wiping strip, for a motor vehicle windshield wiper, comprises a dorsal portion and a wiping lip which are joined together through a hinge, whereby the wiping lip is able to be deflected with respect to a median position. The wiping strip comprises at least two profiled members assembled together, with at least one of these profiled members having a connecting means for connection of one end of the hinge, the hinge being made of a material having a hardness greater than that of one of the profiled members.

9 Claims, 1 Drawing Sheet

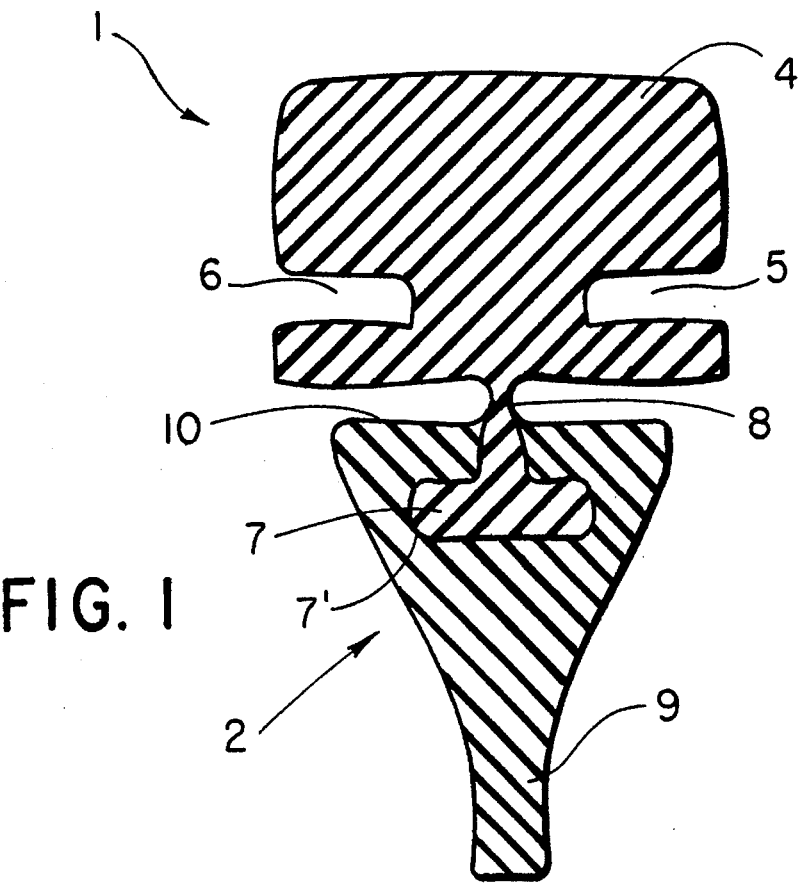
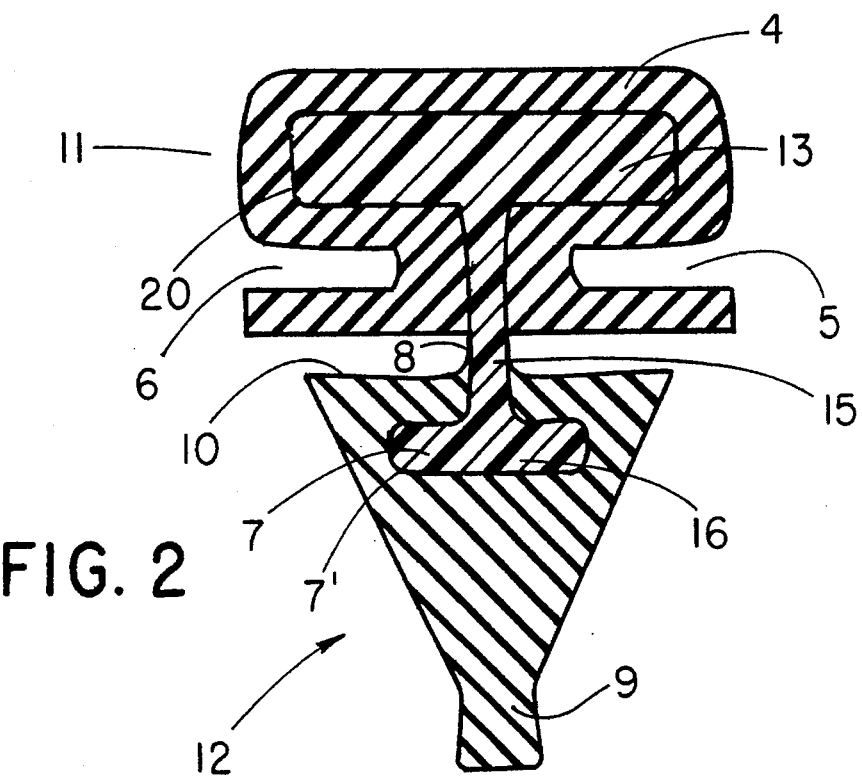

WIPING STRIP HAVING TWO CO-EXTRUDED MEMBERS AND A SCREEN WIPER HAVING SUCH A STRIP

FIELD OF THE INVENTION

The present invention relates to a wiping strip of a screen wiper blade, for example for a windshield wiper for a motor vehicle, in which the wiping strip comprises a dorsal portion which is adapted to be connected mechanically with that part of the structure of the blade which carries the wiping strip, with the latter also including a movable wiping element or wiping lip. The dorsal portion and wiping lip are joined together through a hinge which is so arranged that the wiping lip can be displaced from a median position.

BACKGROUND OF THE INVENTION

French patent specification No. 1 306 952 describes different embodiments of such wiping strips. In that specification, the hinge is defined by a thin longitudinal zone which is disposed between the dorsal portion and the wiping element. This hinge is subjected to high stresses, and forms the weakest part of the screen wiper. It is made of a material the characteristics of which are predetermined having regard to the ability of the wiper to follow the curve of the windshield of the vehicle, and having regard also to the need to ensure that the main function of wiping water from the windshield is properly carried out, with the wiping lip being able to deflect easily. The mechanical strength qualities of the thin zone cannot readily be optimised under these conditions.

DISCUSSION OF THE INVENTION

The object of the invention is to overcome this drawback, to which end it proposes a wiping strip for a screen wiper which has both optimum effectiveness as regards the wiping operation itself, i.e. removal of water, and the ability to follow the curve of the windshield, and also sufficient strength to resist tearing of the improved hinge.

To this end, the invention in its broadest sense provides a wiping strip for a screen wiper comprising a dorsal portion and a wiping lip, which are joined together through a hinge adapted to enable the wiping lip to be displaced with respect to a median position, characterised in that the wiping strip comprises at least two profiled members assembled together, with at least one of the said profiled members having connecting means for engagement with an end of the hinge, the latter being made of a material having a hardness greater than that of the material of the profiled member which defines the connecting means engaged therewith.

In one form of the invention, the wiping strip comprises two said profiled members, one of which has the hinge, the other profiled member having connecting means for cooperation with one end of the hinge.

In another embodiment of the invention, the wiping strip consists of three profiled members, namely a first profiled member defining the dorsal portion, a second profiled member defining the wiping lip, and a third profiled member defining the hinge and cooperating with the first and second profiled members.

The profiled members are preferably co-extruded.

According to a preferred feature of the invention, the connecting means are in the form of a groove. The hinge has a cross section in the form of an I. The groove, or each groove, for receiving the end of the element that defines the hinge has a cross section of complementary shape to the end of the hinge element received in it.

One of the profiled members, defining the dorsal portion, is preferably formed with a pair of longitudinal grooves and is extended in its lower edge by the hinge element, which may be an integral part of this profiled member.

Preferably, the materials of the profiled members are selected from among the following groups:

two grades of co-extruded Santoprene;

hard Santoprene for the first profiled member, co-extruded with Vyram for the second profiled member;

PA for the first profiled member co-extruded with soft PEBA for the second profiled member;

hard EPDM for the first profiled member, co-extruded and continuously co-vulcanised with soft EPDM for the second profiled member; and hard PEBA for the first profiled member, co-extruded and continuously co-vulcanised with soft PVC-nitryl for the second profiled member.

The invention will be understood more clearly on a reading of the description of preferred embodiments of the invention which is given below, by way of example only and with reference to the accompanying drawings.

BRIEF DESCRIPTION OF THE DRAWINGS

FIG. 1 is a view in cross section showing a wiping strip in a first embodiment of the invention.

FIG. 2 is a view in cross section showing a wiping strip in a second embodiment of the invention.

DESCRIPTION OF PREFERRED EMBODIMENTS OF THE INVENTION

Reference is first made to FIG. 1 showing the first embodiment to be described. In FIG. 1, the wiping strip comprises a first profiled member 1 and a second profiled member 2 which is connected to the member 1. The first profiled member ] comprises a dorsal portion 4 having a substantially rectangular cross section, with two side grooves 5 and 6 on opposite sides of the portion 4. A connecting portion 7, having a cross section in the form of an inverted T, projects from one of the transverse faces of the first profiled member 1. The connecting portion 7, integral with the dorsal portion 4, includes a thin web 8 constituting the hinge. The profiled member 1 is made of a suitable elastomeric material, which is preferably a rubbery material having a high hardness and a high modulus of elasticity, such as an ethylene-propylene-diene copolymer (EPDM).

The second profiled member 2 has a wiping lip 9 defining its lower edge, i.e. its edge remote from the first profiled member 1. The opposite edge 10 of the member 2 is formed with a longitudinal groove 7' whereby the member 2 is connected to the connecting portion 7 of the member 1 defining the hinge 8. The groove 7' has a cross section in the form of an inverted T complementary to that of the connecting portion 7. The second profiled member 2 is made of a material having a hardness and modulus of elasticity which are both of lesser magnitude than those of the first profiled member 1.

The first and second profiled members 1 and 2 are co-extruded and co-vulcanised.

By way of example, the pairs of elastomeric materials used are selected from among the following:

two grades of the material sold under the Trade Mark

SANTOPRENE, co-extruded;

hard SANTOPRENE (Trade Mark) material for the first profiled member 1, co-extruded with soft VYRAM (Trade Mark) material for the second profiled member 2;

PA for the first profiled member 1, co-extruded with soft PEBA (Trade Mark) material for the second profiled member 2;

hard EPDM for the first profiled member 1 and soft EPDM for the second profiled member 2, these being co-extruded and co-vulcanised, or continuously co-reticulated by any other suitable continuous method;

hard PEBA (Trade Mark) material for the first profiled member 1, co-extruded with soft thermoplastic PVC-nitryl for the second profiled member 2.

Reference is now made to FIG. 2, showing an embodiment in which the wiping strip consists of three complementary profiled members. In FIG. 2, the first profiled member 11 comprises a dorsal portion 4 of rectangular cross section, again having two side grooves 5 and 6. In this case, the dorsal member 4 has a central cavity 20 which is open through the face of the member 11 that faces towards a second profiled member 12. The latter has the wiping lip 9 defining its edge furthest from the first profiled element 11, i.e. its lower edge, while its opposite edge 10 is again formed with a groove 7' in the form of an inverted T.

A third profiled member 13 has a cross section which is generally in the form of a I. This member 13 is made of a hard material and is interposed between the first profiled member 11 and the second profiled member 12, so as to constitute the hinge. It has an upper longitudinal portion 14 having a cross section complementary to the cross section of the cavity 20 in the first profiled member 11, together with a lower longitudinal portion 16 with a cross section complementary to that of the groove 7' in the second profiled member 12. The two portions 14 and 16 are joined together through a hinge zone 15, or web, having a reduced thickness such as to enable the second profiled member 12 to become inclined with respect to the median plane of symmetry 17 of the wiping strip. Flexing is promoted in said hinge zone at a portion between the first and second profiled members due to said upper and lower portions being received in said profiled members.

The third profiled member 13 is made of a flexible thermoplastic material or a hard extruded thermoplastic material. The three profiled members 11, 12 and 13 are preferably co-extruded.

As mentioned above, the above description with reference to the drawings is by way of non-limiting example. The person skilled in the art will be able to conceive variants without in any way departing from the scope of the present invention, in particular by selecting materials other than those specified above.

What is claimed is:

1. A wiping strip for a screen wiper, comprising a dorsal portion formed from an elastomeric material, a wiping lip formed from an elastomeric material that is different from said dorsal portion elastomeric material, and an elongated thin web hinge element having at least one enlarged transverse width end, said hinge element joining the dorsal portion to the wiping lip and defining therewith, in an undeflected state, a median position of the wiping lip relative to the dorsal portion, whereby the thin web hinge element is flexible and enables the wiping lip to be deflected from said median position by flexing of said hinge element, wherein the wiping strip has at least first and second profiled members assembled together, said second profiled member having said wiping lip and said first profiled member having said dorsal portion, with at least said second profiled member having connecting means which receives sad at least one hinge element end therein to connect said second member to said hinge element end and thereby to promote flexing in said thin web hinge element at a portion thereof external of said second profiled member, the hinge element being made of a material harder than that of at least one of said first and second profiled members.

2. A wiping strip according to claim 1, wherein each of said first and second profiled members defines a respective connecting means and said hinge element has first and second ends, said connecting means respectively engaging said first and second hinge element end to thereby promote said flexing in said portion.

3. A wiping strip according to claim 2, wherein a third profiled member defines said hinge element.

4. A wiping strip according to claim 3, wherein said third profiled member is elongated and has a transverse cross section in the form of an I.

5. A wiping strip according to claim 1, wherein the profiled members are co-extruded.

6. A wiping strip according to claim 1, wherein the said connecting means comprise a groove defined in the corresponding profiled member.

7. A wiping strip according to claim 1, wherein at least said second profiled member connecting means further comprises a groove formed in said second profiled member and the at least one end having a member which defines a cross section complementary to and received in said groove.

8. A wiping strip according to claim 1, wherein said first profiled member dorsal portion further comprises opposed sides each having a longitudinal groove formed therein, and a face joining the two sides and facing towards the wiping lip, said thin web hinge element projecting from said face.

9. A wiping strip according to claim 1, wherein said first profiled member and said second profiled member further comprise, materials selected from among the following groups:

two grades of co-extruded Santoprene;

hard Santoprene for the first profiled member, co-extruded with Vyram for the second profiled member;

PA for the first profiled member co-extruded with soft PEBA for the second profiled member;

hard EPDM for the first profiled member, co-extruded and continuously co-vulcanized with soft EPDM for the second profiled member; and hard PEBA for the first profiled member, co-extruded and continuously co-vulcanized with soft PVC-nitryl for the second profiled member.

\* \* \* \* \*